United States Patent
Wang

(10) Patent No.: US 10,802,704 B2
(45) Date of Patent: Oct. 13, 2020

(54) GESTURE CONTROL METHOD, APPARATUS, TERMINAL DEVICE, AND STORAGE MEDIUM

(71) Applicant: Huawei Technologies Co., Ltd., Shenzhen (CN)

(72) Inventor: Wei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 15/566,582

(22) PCT Filed: Apr. 14, 2015

(86) PCT No.: PCT/CN2015/076536
§ 371 (c)(1),
(2) Date: Oct. 13, 2017

(87) PCT Pub. No.: WO2016/165066
PCT Pub. Date: Oct. 20, 2016

(65) Prior Publication Data
US 2018/0095657 A1 Apr. 5, 2018

(51) Int. Cl.
*G06F 3/0488* (2013.01)
*G06F 1/16* (2006.01)
(Continued)

(52) U.S. Cl.
CPC ........ *G06F 3/04883* (2013.01); *G06F 1/1694* (2013.01); *G06F 3/0484* (2013.01);
(Continued)

(58) Field of Classification Search
CPC .. G06F 3/04883; G06F 1/1694; G06F 3/0484; G06F 3/0488; G06F 2200/1636; G06F 3/0346; G06F 2203/04808
See application file for complete search history.

(56) References Cited

U.S. PATENT DOCUMENTS

2010/0194692 A1 8/2010 Orr et al.
2010/0245272 A1 9/2010 Morita
(Continued)

FOREIGN PATENT DOCUMENTS

CN 101848275 A 9/2010
CN 101943990 A 1/2011
(Continued)

OTHER PUBLICATIONS

Machine Translation and Abstract of Chinese Publication No. CN103809882, May 21, 2014, 35 pages.
(Continued)

*Primary Examiner* — Daniel W Parcher
(74) *Attorney, Agent, or Firm* — Conley Rose, P.C.

(57) ABSTRACT

A gesture control method, a gesture control apparatus and a terminal device to enrich interaction manners of the terminal device, where the method includes detecting a touch action performed on a touchscreen of a terminal device, obtaining a contact area of the touch action on the touchscreen and a z-axis acceleration generated when the touch action is in contact with the touchscreen, determining that the touch action is a joint touch action when the contact area is larger than a preset area and the z-axis acceleration is greater than a preset acceleration, identifying a gesture type corresponding to the joint touch action, and calling a preset function of the terminal device according to the gesture type.

20 Claims, 7 Drawing Sheets

(51) Int. Cl.
*G06F 3/0484* (2013.01)
*G06F 3/0346* (2013.01)

(52) U.S. Cl.
CPC .... *G06F 3/0346* (2013.01); *G06F 2200/1636* (2013.01); *G06F 2203/04808* (2013.01)

(56) References Cited

U.S. PATENT DOCUMENTS

| | | | |
|---|---|---|---|
| 2010/0302172 A1* | 12/2010 | Wilairat | G06F 3/04883 345/173 |
| 2011/0001694 A1 | 1/2011 | Homma et al. | |
| 2012/0056832 A1* | 3/2012 | Miyazaki | G06F 3/04883 345/173 |
| 2012/0262394 A1 | 10/2012 | Sanma et al. | |
| 2013/0106915 A1* | 5/2013 | Lee | G06F 3/0486 345/672 |
| 2013/0169565 A1* | 7/2013 | Funahashi | G06F 3/041 345/173 |
| 2013/0342468 A1* | 12/2013 | Hekstra | G06F 3/0418 345/173 |
| 2014/0092049 A1 | 4/2014 | Gan | |
| 2014/0267100 A1* | 9/2014 | Sohn | G06F 3/0416 345/173 |
| 2014/0325433 A1* | 10/2014 | Hiroura | G06F 3/0488 715/789 |
| 2015/0019963 A1* | 1/2015 | Park | G06F 9/453 715/708 |
| 2015/0339832 A1* | 11/2015 | Huang | G06T 3/40 345/666 |
| 2018/0081461 A1 | 3/2018 | Funahashi et al. | |

FOREIGN PATENT DOCUMENTS

| | | |
|---|---|---|
| CN | 102736791 A | 10/2012 |
| CN | 102799292 A | 11/2012 |
| CN | 103809882 A | 5/2014 |
| CN | 104049728 A | 9/2014 |
| CN | 104049759 A | 9/2014 |
| EP | 2778866 A1 | 9/2014 |
| JP | 2008192092 A | 8/2008 |
| JP | 2010044520 A | 2/2010 |
| JP | 2010231618 A | 10/2010 |
| JP | 2011014044 A | 1/2011 |
| JP | 2012058856 A | 3/2012 |
| JP | 2013137613 A | 7/2013 |
| JP | 2015060455 A | 3/2015 |
| WO | WO-2014030405 A1 * | 2/2014 ............... G06T 3/40 |

OTHER PUBLICATIONS

Machine Translation and Abstract of Chinese Publication No. CN104049759, Sep. 17, 2014, 29 pages.
Foreign Communication From a Counterpart Application, PCT Application No. PCT/CN2015/076536, English Translation of International Search Report dated Jan. 8, 2016, 2 pages.
Foreign Communication From a Counterpart Application, PCT Application No. PCT/CN2015/076536, English Translation of Written Opinion dated Jan. 8, 2016, 8 pages.
Heo, S., et al., "ForceTap: Extending the Input Vocabulary of Mobile Touch Screens by adding Tap Gestures," XP055010529, Aug. 2011, 10 pages.
Foreign Communication From a Counterpart Application, European Application No. 15888771.1, Extended European Search Report dated Apr. 6, 2018, 10 pages.
Machine Translation and Abstract of Japanese Publication No. JP2010044520, Feb. 25, 2010, 16 pages.
Machine Translation and Abstract of Japanese Publication No. JP2015060455, Mar. 30, 2015, 20 pages.
Foreign Communication From a Counterpart Application, Japanese Application No. 2017-553945, Japanese Office Action dated Dec. 3, 2018, 6 pages.
Foreign Communication From a Counterpart Application, Japanese Application No. 2017-553945, English Translation of Japanese Office Action dated Dec. 3, 2018, 7 pages.
Foreign Communication From a Counterpart Application, Chinese Application No. 201580029659.2, Chinese Office Action dated Dec. 28, 2018, 10 pages.
Machine Translation and Abstract of Japanese Publication No. JP2008192092, Aug. 21, 2008, 28 pages.
Foreign Communication From a Counterpart Application, Japanese Application No. 2017-553945, Japanese Notice of Rejection dated Mar. 18, 2019, 3 pages.
Foreign Communication From a Counterpart Application, Japanese Application No. 2017-553945, English Translation of Japanese Notice of Rejection dated Mar. 18, 2019, 3 pages.

* cited by examiner

GESTURE CONTROL METHOD, APPARATUS, TERMINAL DEVICE, AND STORAGE MEDIUM

CROSS-REFERENCE TO RELATED APPLICATION

This application is a U.S. National Stage of International Patent Application No. PCT/CN2015/076536 filed on Apr. 14, 2015, which is hereby incorporated by reference in its entirety.

TECHNICAL FIELD

Embodiments of the present disclosure relate to the touch control field, and in particular, to a gesture control method, an apparatus, a terminal device, and a storage medium.

BACKGROUND

As a man-machine interaction device, a touchscreen is more widely applied. A user performs basic touch actions on the touchscreen, such as press-down, move, and lift-up in order to generate various touch gestures. Because of operation convenience, a tap gesture is a touch gesture that is most frequently used on an existing terminal device. For an input tap gesture, the terminal device determines, according to a position of the input tap gesture, an application program corresponding to the position, and triggers the application program to perform a corresponding operation. If the position is not corresponding to an application program, no operation is triggered.

Currently, all terminal devices identify touch gestures based on positions and tracks. As more functions and more application software are used on a terminal device, such touch gestures that are based on a two-dimensional plane can no longer meet an interaction requirement of the terminal device, and a new interaction manner urgently needs to be introduced.

SUMMARY

To resolve a technical problem, embodiments of the present disclosure provide a gesture control method, an apparatus, a terminal device, and a storage medium to enrich interaction manners of the terminal device.

To resolve the foregoing technical problem, a first aspect of the embodiments of the present disclosure provides a gesture control method, including detecting a touch action performed on a touchscreen of a terminal device, obtaining a contact area of the touch action on the touchscreen and a z-axis acceleration generated when the touch action is in contact with the touchscreen, determining that the touch action is a joint touch action if the contact area is larger than a preset area and the z-axis acceleration is greater than a preset acceleration, identifying a gesture type corresponding to the joint touch action, and calling a preset function of the terminal device according to the gesture type.

With reference to the first aspect, in a first possible implementation manner, identifying a gesture type corresponding to the joint touch action, and calling a preset function of the terminal device according to the gesture type includes determining a user interface on which the joint touch action is performed and an application program to which the user interface belongs, identifying the gesture type corresponding to the joint touch action, and calling a preset function corresponding to the application program according to the gesture type.

With reference to the first aspect, in a second possible implementation manner, identifying a gesture type corresponding to the joint touch action, and calling a preset function of the terminal device according to the gesture type includes determining a user interface on which the joint touch action is performed, and querying an application program associated with the gesture type, and starting or closing the application program if the user interface on which the joint action is performed is a system desktop of the terminal device.

With reference to the first aspect, in a third possible implementation manner, identifying a gesture type corresponding to the joint touch action, and calling a preset function of the terminal device according to the gesture type includes determining a user interface on which the joint touch action is performed, identifying the gesture type corresponding to the joint touch action, and performing an operation on the user interface according to the gesture type, where the operation includes screen capture, icon arrangement, or theme replacement.

With reference to any one of the first aspect, or the first to the third possible implementation manners of the first aspect, in a fourth possible implementation manner, the gesture type corresponding to the touch action includes a tap gesture or a sliding gesture, where the tap gesture includes at least one of a single-point single-tap gesture, a single-point multi-tap gesture, or a multi-point tap gesture, and the sliding track includes at least one of a closed track or a non-closed track.

With reference to any one of the first aspect, or the first to the fourth possible implementation manners of the first aspect, in a fifth possible implementation manner, obtaining a contact area of the touch action on the touchscreen and a z-axis acceleration generated when the touch action is in contact with the touchscreen includes obtaining a quantity m of pixels of the touch action in a contact region of the touchscreen, a quantity n of pixels of the touchscreen, and an area s of the touchscreen, obtaining the contact area of the touch action on the touchscreen by means of calculation using a formula $s*(m/n)$, and obtaining the z-axis acceleration of the touch action using a gravity acceleration sensor that comes with the terminal device.

With reference to any one of the first aspect, or the first to the fifth possible implementation manners of the first aspect, in a sixth possible implementation manner, before detecting a touch action performed on a touchscreen of a terminal device, the method further includes customizing a mapping relationship between the preset function and the gesture type corresponding to the joint touch action, and storing the mapping relationship in a mapping relationship database.

A second aspect of the embodiments of the present disclosure provides a gesture control apparatus, including a detection module configured to detect a touch action performed on a touchscreen of a terminal device, an obtaining module configured to obtain a contact area of the touch action on the touchscreen and a z-axis acceleration generated when the touch action is in contact with the touchscreen, a determining module configured to determine that the touch action is a joint touch action if the contact area is larger than a preset area and the z-axis acceleration is greater than a preset acceleration, and a call module configured to identify a gesture type corresponding to the joint touch action, and call a preset function of the terminal device according to the gesture type.

With reference to the second aspect, in a first possible implementation manner, the call module includes a first determining unit configured to determine a user interface on which the joint touch action is performed and an application program to which the user interface belongs, and a first call unit configured to identify the gesture type corresponding to the joint touch action, and call a preset function corresponding to the application program according to the gesture type.

With reference to the second aspect, in a second possible implementation manner, the call module includes a second determining unit configured to determine a user interface on which the joint touch action is performed, and if the user interface on which the joint action is performed is a system desktop of the terminal device, a second call unit configured to query an application program associated with the gesture type, and start or close the application program.

With reference to the second aspect, in a third possible implementation manner, the call module includes a third determining unit configured to determine a user interface on which the joint touch action is performed, and a third call unit configured to identify the gesture type corresponding to the joint touch action, and perform an operation on the user interface according to the gesture type, where the operation includes screen capture, icon arrangement, or theme replacement.

With reference to any one of the second aspect, or the first to the third possible implementation manners of the second aspect, in a fourth possible implementation manner, the gesture type corresponding to the touch action includes a tap gesture or a sliding gesture, where the tap gesture includes at least one of a single-point single-tap gesture, a single-point multi-tap gesture, or a multi-point tap gesture, and the sliding track includes at least one of a closed track or a non-closed track.

With reference to any one of the second aspect, or the first to the fourth possible implementation manners of the second aspect, in a fifth possible implementation manner, obtaining module includes a first obtaining unit configured to obtain, a quantity m of pixels of the touch action in a contact region of the touchscreen, a quantity n of pixels of the touchscreen, and an area s of the touchscreen, a calculation unit configured to obtain the contact area of the touch action on the touchscreen by means of calculation using a formula $s*(m/n)$, and a second obtaining unit configured to obtain the z-axis acceleration of the touch action using a gravity acceleration sensor that comes with the terminal device.

With reference to any one of the second aspect, or the first to the fifth possible implementation manners of the second aspect, in a sixth possible implementation manner, the gesture control apparatus further includes a mapping module configured to customize a mapping relationship between the gesture type corresponding to the joint touch action and the preset function, and store the mapping relationship in a mapping relationship database.

A third aspect of the embodiments of the present disclosure provides a gesture identification apparatus, including a processor and a memory, where a set of program code is stored in the memory, and the processor calls the program code stored in the memory to perform the operations of detecting a touch action performed on a touchscreen of a terminal device, obtaining a contact area of the touch action on the touchscreen and a z-axis acceleration generated when the touch action is in contact with the touchscreen, determining that the touch action is a joint touch action if the contact area is larger than a preset area and the z-axis acceleration is greater than a preset acceleration, and identifying a gesture type corresponding to the joint touch action, and calling a preset function of the terminal device according to the gesture type.

With reference to the third aspect, in a first possible implementation manner, that the processor identifying the gesture type corresponding to the joint touch action, and calling a corresponding preset function of the terminal device according to the gesture type includes determining a user interface on which the joint touch action is performed and an application program to which the user interface belongs, identifying the gesture type corresponding to the joint touch action, and calling a preset function corresponding to the application program according to the gesture type.

With reference to the third aspect, in a second possible implementation manner, that the processor identifying the gesture type corresponding to the joint touch action, and calling a corresponding preset function of the terminal device according to the gesture type includes determining a user interface on which the joint touch action is performed, and querying an application program associated with the gesture type, and starting or closing the application program if the user interface on which the joint action is performed is a system desktop of the terminal device.

With reference to the third aspect, in a third possible implementation manner, the call module includes a third determining unit configured to determine a user interface on which the joint touch action is performed, and a third call unit configured to identify the gesture type corresponding to the joint touch action, and perform an operation on the user interface according to the gesture type, where the operation includes screen capture, icon arrangement, or theme replacement.

With reference to any one of the third aspect, or the first to the third possible implementation manners of the third aspect, in a fourth possible implementation manner, the gesture type corresponding to the touch action includes a tap gesture or a sliding gesture, where the tap gesture includes at least one of a single-point single-tap gesture, a single-point multi-tap gesture, or a multi-point tap gesture, and the sliding track includes at least one of a closed track or a non-closed track.

With reference to any one of the third aspect, or the first to the fourth possible implementation manners of the third aspect, in a fifth possible implementation manner, that the processor performs the obtaining a contact area of the touch action on the touchscreen and a z-axis acceleration generated when the touch action is in contact with the touchscreen includes obtaining a quantity m of pixels of the touch action in a contact region of the touchscreen, a quantity n of pixels of the touchscreen, and an area s of the touchscreen, obtaining the contact area of the touch action on the touchscreen by means of calculation using a formula $s*(m/n)$, and obtaining the z-axis acceleration of the touch action using a gravity acceleration sensor that comes with the terminal device.

With reference to any one of the third aspect, or the first to the fifth possible implementation manners of the third aspect, in a sixth possible implementation manner, the processor is further configured to perform the operation of customizing a mapping relationship between the preset function and the gesture type corresponding to the joint touch action, and storing the mapping relationship in a mapping relationship database.

A fourth aspect of the embodiments of the present disclosure provides a terminal device, including any one of the foregoing gesture control apparatus, the touchscreen, or the gravity sensor.

A fifth aspect of the embodiments of the present disclosure provides a storage medium configured to control a computer device to perform a gesture control method, where the method includes the steps of detecting a touch action performed on a touchscreen of a terminal device, obtaining a contact area of the touch action on the touchscreen and a z-axis acceleration generated when the touch action is in contact with the touchscreen, determining that the touch action is a joint touch action if the contact area is larger than a preset area and the z-axis acceleration is greater than a preset acceleration, identifying a gesture type corresponding to the joint touch action, and calling a preset function of the terminal device according to the gesture type.

The following beneficial effects are achieved by implementing the present disclosure.

A contact area and a z-axis acceleration that are generated on a touchscreen are obtained, a joint touch action is identified, a gesture type corresponding to the joint touch action is identified, and a preset function of a terminal device is called according to the gesture type. This provides an additional method for interaction with the terminal device based on the contact area and the z-axis acceleration, thereby enriching methods for interaction with the terminal device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
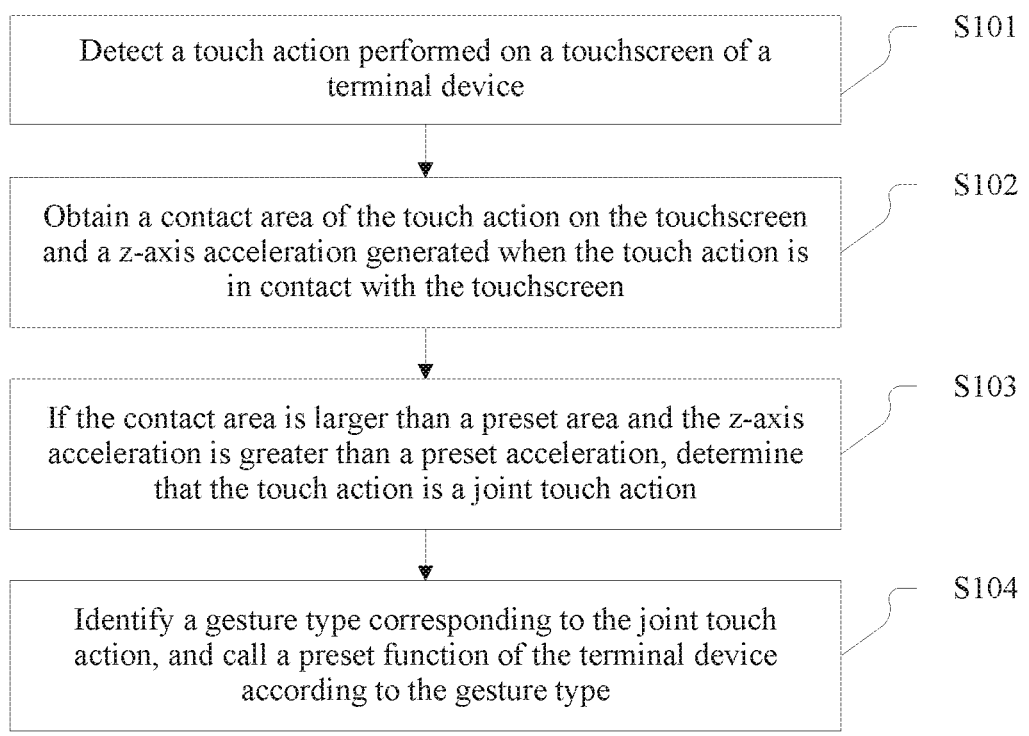
FIG. 1 is a schematic flowchart of a gesture control method according to an embodiment of the present disclosure.

Referring to FIG. 1, FIG. 1 is a schematic flowchart of a gesture control method according to an embodiment of the present disclosure. In this embodiment of the present disclosure, the method includes steps S101 to S104.

Step S101: Detect a touch action performed on a touchscreen of a terminal device.

A touch action performed by a finger on the touchscreen of the terminal device may be detected in a screen-on state or a screen-off state, and a touch signal is generated. A screen-on state means that a backlight of the touchscreen is turned on, and the screen-on state includes a locked screen-on state and an unlocked screen screen-on state. A screen-off state means that the backlight of the touchscreen is turned off. The touchscreen may be a special touchscreen, or may be a display device with a touch function. In a multi-touch technology, a touch action performed on one or more touch points may be received by the touchscreen using a touch event processing function, and a corresponding gesture is generated. Different gestures indicate different operations. Identification and obtaining of a touch gesture may vary with different operating principles of touch technologies. This is not limited in the present disclosure. Basic finger touch actions may include finger actions such as press-down (down), move, and lift-up (up). Different types of gestures are formed by combining different basic touch actions. For example, a tap gesture includes two basic touch actions press-down and lift-up, and a sliding gesture includes three basic touch actions press-down, move, and lift-up. When a finger is in contact with a touchscreen, a touch signal is generated on the touchscreen, and a touch action performed on the touchscreen of a terminal device is detected according to the touch signal.

It should be understood that, in the present disclosure, a touch action performed on a touchscreen is not limited to being performed by a finger. The touch action may be performed on the touchscreen by another object, and touchscreens based on different touch technologies can sense touch actions performed by different types of objects.

Step S102: Obtain a contact area of the touch action on the touchscreen and a z-axis acceleration generated when the touch action is in contact with the touchscreen.

Further, a contact area refers to an area of a contact region generated when a finger is in contact with a touchscreen. When the finger presses down the touchscreen for the first time, an area of a contact region that is pressed down for the first time is obtained. A specific speed exists in a z-axis direction when the finger touches the touchscreen. A speed of the finger is attenuated to zero during an extremely short period of time because of the rigid touchscreen, thereby generating a gravity acceleration in the z-axis direction. A greater speed of the finger in the z-axis direction indicates a greater gravity acceleration generated in the z-axis direction. Preferentially, the touch action refers to an action when a finger joint is in contact with the touchscreen.

In this embodiment of the present disclosure, the z axis refers to a direction perpendicular to the touchscreen. It can be understood that when the finger is in contact with the touchscreen at a specific speed, a direction in which the speed is generated is not perpendicular to the touchscreen. Therefore, a z-axis acceleration that can be obtained is modified using a cosine value of an angle. A size of the angle cannot be directly measured, but can be set according to an empirical value.

Step S103: If the contact area is larger than a preset area and the z-axis acceleration is greater than a preset acceleration, determine that the touch action is a joint touch action.

In step S103, if the obtained contact area is larger than the preset area and the obtained z-axis acceleration is greater than the preset acceleration, the touch action performed on the touchscreen is determined as the joint touch action. It can be understood that, in this embodiment of the present disclosure, the joint touch action is a newly defined touch action. The joint touch action may not necessarily be an action triggered by a finger joint, but may be an action triggered by another object by tapping the touchscreen at a high speed. In this embodiment of the present disclosure, any touch action meeting the foregoing constraints of the contact area and the z-axis acceleration may be referred to as the joint touch action.

Step S104: Identify a gesture type corresponding to the joint touch action, and call a preset function of the terminal device according to the gesture type.

The touch action includes at least one basic touch action. A gesture type corresponding to the joint touch action is identified, and a corresponding preset function of the terminal device is called according to the gesture type. The corresponding preset function of the terminal device includes starting/closing an application program on the terminal device calling a function in the application program, for example, starting a corresponding application program on the terminal device, including entering a setting menu, starting a camera, starting screen capture, or replacing a theme, calling a reply function in a short message application program, calling a video call function in an instant communications application program, or calling a screen capture function in a browser application program. Different functions corresponding to different gesture types can be customized by a user in advance. The application program may be a system application program or a third-party application program. The system application program refers to an application program that comes with an operating system of the terminal device. For example, functions corresponding to the system application program include a dialing function, a setting function, and a short message user interface entering function. The third-party application program refers to an application program installed on the terminal device.

Optionally, identifying a gesture type corresponding to the joint touch action, and calling a preset function of the terminal device according to the gesture type includes determining a user interface on which the joint touch action is performed and an application program to which the user interface belongs, identifying the gesture type corresponding to the joint touch action, and calling a preset function corresponding to the application program according to the gesture type.

Further, the application program presents multiple different user interfaces on the terminal device, and the application program includes various preset functions. When a joint touch action is performed on the terminal device, a user interface on which the joint touch action is performed and an application program to which the user interface belongs are determined, the gesture type corresponding to the joint touch action is identified. The gesture type includes a tap gesture or a sliding gesture, and a preset function in the application program to which the user interface belongs is called according to the gesture type.

For example, when a user interface on which the joint touch action is performed is a user interface of instant communications software, a gesture type corresponding to the joint touch action is a two-point single-tap gesture, and a preset function corresponding to the two-point single-tap gesture in the instant communications software is a partial-screen capture function, a screen capture function is enabled, and a size-adjustable screen capture area is displayed on the user interface on which the joint touch action is performed. After adjusting a required screen capture area, a user stores a captured picture in a specified location of the terminal device. Alternatively, when a user interface on which the joint touch action is performed is a user interface of instant communications software, a gesture type corresponding to the joint touch action is a three-point single-tap gesture, and a preset function corresponding to the three-point single-tap gesture in the instant communications software is a full-screen capture function, a picture generated in the full screen is captured, and the generated picture is stored in a specified location of the terminal device.

For another example, when a user interface on which the joint touch action is performed is a user interface of camera application software, the gesture type corresponding to the joint touch action is an S-track gesture, and a preset function corresponding to the S-track gesture in the camera application software is a photographing function, the photographing function is enabled. Alternatively, a preset function corresponding to an M-track gesture in the camera application software is a video recording function.

It should be noted that in different types of application programs, preset functions corresponding to a same gesture type may be the same or may be different, a preset function corresponding to a gesture type can be customized according to a requirement.

Optionally, identifying a gesture type corresponding to the joint touch action, and calling a preset function of the terminal device according to the gesture type includes determining a user interface on which the joint touch action is performed, and querying an application program associated with the gesture type, and starting or closing the application program if the user interface on which the joint action is performed is a system desktop of the terminal device.

Further, when the joint touch action is performed on the terminal device, the user interface on which the joint touch action is performed is determined, and a type of the user interface is determined. If the user interface is a system desktop of the terminal device, an application program associated with the gesture type is queried, and an operating status of the associated application program is obtained. If the associated application program is in a non-started state, the associated application program is started, and a user interface obtained after the associated application program is started is displayed on the terminal device, or the associated application program is closed if the associated application program is in a background operating state. In this embodiment of the present disclosure, the application program may be a system application program or a third-party application program. This is not limited herein. It can be understood that, in a mobile terminal, because of a limited size of a touchscreen, a system desktop of the mobile terminal is generally divided into multiple sub-user interfaces. When a user interface on which a joint touch action is performed is any sub-user interface among the multiple sub-user interfaces, the user interface on which the joint touch action is performed can be determined as a system desktop.

For example, when a joint touch action performed on a terminal device is detected, a user interface on which the joint touch action is performed is determined as a system desktop, a gesture type corresponding to the joint touch action is identified as a C-track gesture, it is found, by means of query, that a preset function corresponding to the C-track gesture is to call a camera application program, and an operating status of the camera application program is obtained. The camera application program is started, and a camera user interface is displayed on the terminal device if the camera application program is in a non-started state, or the camera application program is closed if the camera application program is in a background operating state. Alternatively, a gesture type corresponding to the joint touch action is identified as an S-track gesture, it is found, by means of query, that a preset function corresponding to the S-track gesture is to call a short message application program, and an operating status of the short message application program is obtained. The short message application program is started, and a short message editing user interface is displayed on the terminal device if the short message application program is in a non-started state, or the short message application program is closed if the short message application program is in a background operating state. Alternatively, a gesture type corresponding to the joint touch action is identified as a single-point three-tap gesture, it is found, by means of query, that an application program corresponding to the single-point three-tap gesture is to call a music player application program, and an operating status of the music player application program is obtained. The music player application program is started, and a song list user interface of the music player is displayed on the terminal device if the music player application program is in a non-started state, or the music player application program is closed if the music player application program is in a background operating state. In this embodiment of the present disclosure, the gesture type may be a tap gesture or a sliding gesture, and an association relationship between the gesture type and the application program may be customized according to a user requirement.

Optionally, identifying a gesture type corresponding to the joint touch action, and calling a preset function of the terminal device according to the gesture type includes determining a user interface on which the joint touch action is performed, identifying the gesture type corresponding to the joint touch action, and performing an operation on the user interface according to the gesture type.

Further, a user interface on which the joint touch action is performed is determined, the gesture type corresponding to the joint touch action is identified, and an operation is performed on the user interface according to the gesture type when the joint touch action is performed on the terminal device. Different application programs present different user interfaces on the terminal device, and a same application program presents multiple different user interfaces on the terminal device. In this embodiment of the present disclosure, the operation is merely performed on the user interface on which the joint touch action is performed. The operation includes icon arrangement, theme replacement, screen capture, or the like. Operations corresponding to a same gesture type on different user interfaces may be the same or may be different.

For example, when a user interface on which the joint touch action is performed is a setting user interface of an instant communications application program, the gesture type corresponding to the joint touch action is a two-point single-tap gesture, and a preset function corresponding to the two-point single-tap gesture is a screen capture function, the screen capture function is called to perform a screen capture operation on the current setting user interface. Alternatively, when a user interface on which the joint touch action is performed is a system desktop of the terminal device, a gesture type corresponding to the joint touch action is a two-point single-tap gesture, and a preset function corresponding to the two-point single-tap gesture is a screen capture function, the screen capture function is called to perform a screen capture operation on the current system desktop. Alternatively, a user interface on which the joint touch action is performed is a system desktop of the terminal device, a gesture type corresponding to the joint touch action is a 1-track gesture, and a preset function corresponding to the 1-track gesture is an icon arrangement function, the icon arrangement function is called to rearrange the current system desktop.

In an implementation in this embodiment of the present disclosure, a contact area and a z-axis acceleration that are generated on a touchscreen are obtained, a joint touch action is identified, a gesture type corresponding to the joint touch action is identified, and a preset function of a terminal device is called according to the gesture type. This provides an additional method for interaction with the terminal device based on the contact area and the z-axis acceleration, thereby enriching methods for interaction with the terminal device.

Figure 2A:
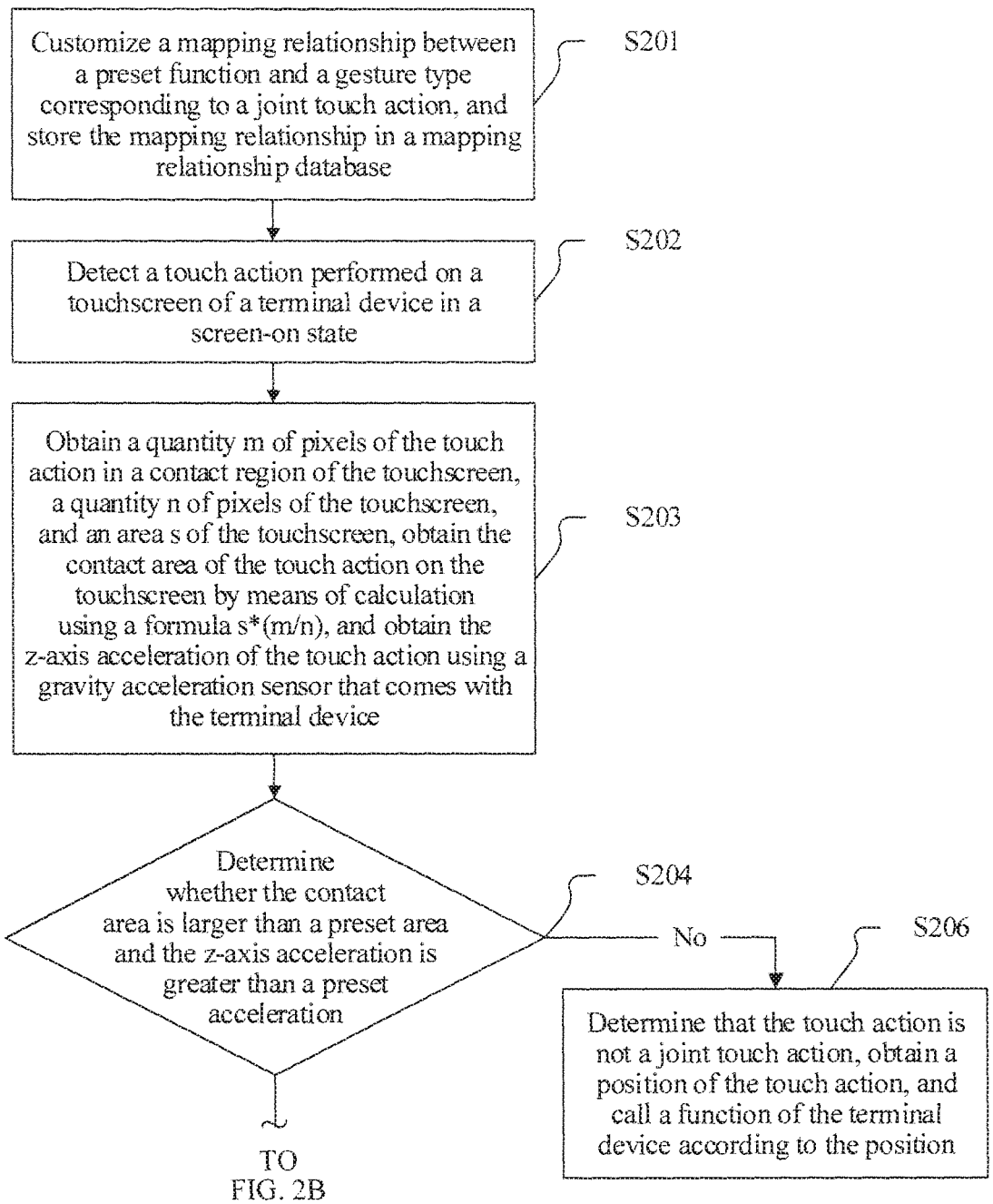
FIG. 2A and FIG. 2B are another schematic flowchart of a gesture control method according to an embodiment of the present disclosure.
Figure 2B:
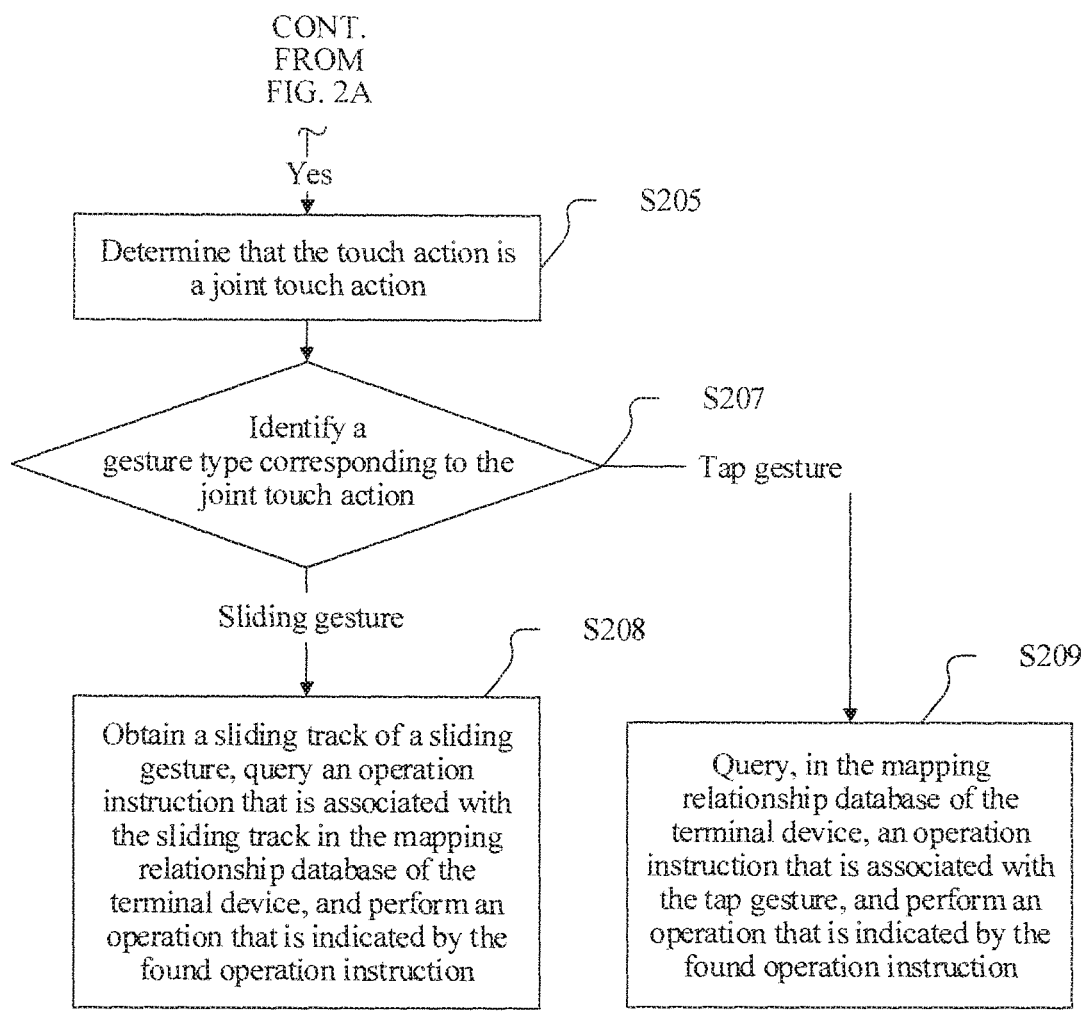

Referring to FIG. 2A and FIG. 2B, FIG. 2A and FIG. 2B are another schematic flowchart of a gesture control method according to an embodiment of the present disclosure. In this embodiment of the present disclosure, the method includes steps S201 to S209.

Step S201: Customize a mapping relationship between a preset function and a gesture type corresponding to a joint touch action, and store the mapping relationship in a mapping relationship database.

Further, various gesture types corresponding to the joint touch action are preset on a terminal device. A user can select different functions of the terminal device and associate the different functions with different gesture types. In addition, the terminal device can learn a new gesture type, and locally store the new gesture type.

For example, the gesture types preset by the terminal device include a single-point single-tap gesture, a single-point double-tap gesture, a two-point single-tap gesture, a sliding-up gesture, and a sliding-down gesture. The foregoing gestures are all joint touch actions. The user can enter a mapping relationship editing user interface. The foregoing gestures are displayed on the mapping relationship editing user interface. The user can select one of the gestures and associate the gesture with a required function. For example, the single-point single-tap gesture is associated with an operation instruction for entering a setting option. The single-point double-tap gesture is associated with an operation instruction for starting screen capture. The two-point single-tap gesture is associated with an operation instruction for switching a target application to a background operating state. The sliding-up gesture is associated with an operation instruction for starting a browser, and the sliding-down gesture is associated with an operation instruction for switching a theme.

When a new gesture type needs to be learned, the user can enter a gesture-learning user interface, and draw a customized gesture on the gesture-learning user interface at least twice. If the customized gesture is a sliding gesture, when a similarity of a sliding track of a gesture customized each time is greater than a preset threshold, it indicates that the new gesture is successfully learned. If the customized gesture is a tap gesture, when a quantity of taps performed each time is the same as a quantity of touch points used each time, it indicates that the new gesture is successfully learned, and the newly learned gesture is stored in a local gesture base. When the user enters a mapping relationship editing user interface, the new gesture is displayed on the mapping relationship editing user interface such that the user selects an operation instruction and associate the operation instruction with the new gesture.

For example, if the new gesture needs to be learned is about drawing the letter C, the user enters the gesture-learning user interface, draws the letter C on the gesture-learning user interface for twice according to displayed guidance information, obtains sliding tracks obtained by drawing twice, fits the sliding tracks to a planar figure, and compares a similarity between the two sliding tracks by means of a similarity algorithm. A greater similarity indicates that the shapes of the two sliding tracks are more similar, and a lower similarity indicates that there is a bigger difference between the shapes of the two sliding tracks. If the similarity obtained by means of calculation is greater than the preset threshold, it indicates that the new gesture is successfully learned. If the gesture that needs to be learned and that is about drawing the letter C is a three-point single-tap gesture, the three-point single-tap gesture is performed twice on the gesture-learning user interface according to displayed guidance information. When it is found, by means of comparison, that quantities of touch points obtained by drawing twice are both 3, and a quantity of taps on each touch point are both 1, it indicates that the three-point single-tap gesture is successfully learned.

It should be noted that the preset function may be starting/closing an application program on the terminal device, or enabling a function in the application program.

Step S202: Detect a touch action performed on a touchscreen of a terminal device in a screen-on state.

Further, a touch action performed by a finger on a touchscreen of a terminal device may be detected in a screen-on state, and a touch signal is generated. The screen-on state includes a locked screen-on state and an unlocked screen-on state. The touchscreen may be a special touchscreen, or may be a display device with a touch function. In a multi-touch technology, a touch action performed on one or more touch points may be received by the touchscreen using a touch event processing function, and a corresponding gesture is generated. Different gestures indicate different operations. Identification and obtaining of a touch gesture may vary with different operating principles of touch technologies. This is not limited in the present disclosure. Basic finger touch actions may include finger actions such as press-down, move, and lift-up. Different types of gestures are formed by combining different basic touch actions. For example, a tap gesture includes two basic touch actions press-down and lift-up, and a sliding gesture includes three basic touch actions press-down, move, and lift-up. When a finger is in contact with a touchscreen, a touch signal is generated on the touchscreen, and a touch action performed on the touchscreen of a terminal device is detected according to the touch signal.

For example, a touchscreen of the terminal device is a capacitive touchscreen. Four electrodes are disposed on four corners of the capacitive touchscreen, and a high frequency signal exists on a surface of the capacitive touchscreen. When a finger is in contact with the touchscreen, a coupling capacitance is generated in a contact region, and a low current from the contact region to a direction of the finger is generated. Currents flowing in the four electrodes are changing, and a touch action performed on the terminal device can be detected by detecting changes of the currents in the electrodes.

It should be understood that, in the present disclosure, a touch action performed on a touchscreen is not limited to being performed by a finger. The touch action may be performed on the touchscreen by another object, and touchscreens based on different touch technologies can sense touch actions performed by different types of objects.

Step S203: Obtain a quantity m of pixels of the touch action in a contact region of the touchscreen, a quantity n of pixels of the touchscreen, and an area s of the touchscreen, obtain the contact area of the touch action on the touchscreen by means of calculation using a formula $s*(m/n)$, and obtain the z-axis acceleration of the touch action using a gravity acceleration sensor that comes with the terminal device.

Further, a contact area refers to an area of a contact region generated when a finger is in contact with a touchscreen. When the finger presses down the touchscreen for the first time, an area of a contact region that is pressed down for the first time is obtained. A specific speed exists in a z-axis direction when the finger touches the touchscreen. A speed of the finger is attenuated to zero during an extremely short period of time because of the rigid touchscreen, thereby generating a gravity acceleration in the z-axis direction. A greater speed of the finger in the z-axis direction indicates a greater gravity acceleration generated in the z-axis direction. In this embodiment of the present disclosure, the z axis refers to a direction perpendicular to the touchscreen. A method for calculating a contact area may be obtaining a quantity m of pixels of a touch action in a contact region of a touchscreen, obtaining a quantity n of pixels of the touchscreen, where the quantity n of pixels of the touchscreen is fixed and is determined by a resolution of the touchscreen, obtaining an area s of the touchscreen, where the area s of the touchscreen is also fixed, and the area s may be stored in a read-only memory (ROM) of a terminal device in advance, and obtaining an area of the contact region by means of calculation using a formula $s*(m/n)$. A z-axis acceleration of the touch action is obtained using a gravity acceleration sensor that comes with the terminal device. Currently, the gravity acceleration sensor is commonly built in terminal devices such as a smartphone and a tablet.

It should be noted that, in this embodiment of the present disclosure, the z-axis acceleration refers to an absolute value of an acceleration based on a reference of the gravity acceleration. A person skilled in the art may learn that the gravity acceleration is 9.8 newtons per kilogram (N/kg), and the z-axis acceleration is an absolute value of a variable based on a reference of 9.8 (N/kg), where the variable may change in a forward manner or in a reverse manner.

The method for obtaining a quantity m of pixels of a touch action in a contact region of a touchscreen may be as follows. In an example in which a touchscreen is a capacitive touchscreen, it can be learned from the foregoing principle of the capacitive touchscreen that when a finger of a user is in contact with the capacitive touchscreen, because of an effect of a human body electric field, a coupling capacitor is formed between the finger and the contact region, and a high frequency signal exists in the contact region such that the finger absorbs a current, and the current separately flows out of electrodes of four corners of the capacitive touchscreen. Theoretically, strength of the current flowing through the four electrodes is inversely proportional to a distance between the finger and the four corners. The contact region of the touch action can be calculated using a change of the currents in the four electrodes. A planar figure is obtained by performing noise reduction and graphics fitting processing on the contact region. In this case, a quantity m of pixels in the planar figure can be collected.

Step S204: Determine whether the contact area is larger than a preset area and the z-axis acceleration is greater than a preset acceleration.

The contact area obtained by means of calculation in step S203 is compared with a preset area, and the z-axis acceleration obtained by means of calculation in step S203 is compared with a preset acceleration. If comparison results indicate that the contact area is larger than the preset area and the z-axis acceleration is greater than the preset acceleration, step S205 is performed, or if comparison results indicate that the contact area is not larger than the preset area or the z-axis acceleration is not greater than the preset acceleration, step S206 is performed.

The preset area and the preset acceleration can be set according to a requirement. This is not limited in the present disclosure.

Step S205: Determine that the touch action is a joint touch action.

In this embodiment of the present disclosure, the joint touch action is a newly defined touch action. The joint touch action may not necessarily be an action triggered by a finger joint, but may be an action triggered by another object by tapping the touchscreen at a high speed. In this embodiment of the present disclosure, any touch action meeting the foregoing constraints of the contact area and the z-axis acceleration may be referred to as the joint touch action.

Step S206: Determine that the touch action is not a joint touch action, obtain a position of the touch action, and call a function of the terminal device according to the position.

Calling the preset function of the terminal device using the position of the touch action is disclosed in detail in other approaches, and details are not described herein.

Step S207: Identify a gesture type corresponding to the joint touch action.

Within duration of a touch operation, a corresponding gesture type is identified according to basic touch actions included in the joint touch action. For example, a single-point single-tap gesture means that a press-down action and a lift-up action are performed once on one touch point, a single-point double-tap gesture means that a press-down action and a lift-up action are performed twice on one touch point, and a time interval between the actions performed the first time and the actions performed the second time is less than a preset time, and a sliding gesture means that a press-down action is performed on one touch point, and a lift-up action is performed on another touch point, and a sliding track is formed during a move process.

Step S208: Obtain a sliding track of a sliding gesture, query an operation instruction that is associated with the sliding track in the mapping relationship database of the terminal device, and perform an operation that is indicated by the found operation instruction.

For example, if the sliding track of the sliding gesture is a closed graph, and it is found, in the mapping relationship database of the terminal device, that an operation instruction associated with the closed graph is about starting screen capture, an operation of starting screen capture is performed, a size-adjustable screen capture box is displayed on a user interface, a picture in the screen capture box is stored in a specified location of the terminal device when a user determines to save a captured picture. If the sliding track of the sliding gesture is a non-closed graph, and it is found, in the mapping relationship database of the terminal device, that an operation instruction associated with the non-closed graph is about replacing a theme, an operation of replacing a theme is performed, and a user interface including multiple theme thumbnails is displayed, after selecting a required theme, the user switches a current theme to a selected theme. If the sliding track of the sliding gesture is a circle, and it is found, in the mapping relationship database of the terminal device, that an operation instruction associated with the circle is about starting partial-screen capture, an area included in the circle is captured, and a picture obtained by means of capturing is stored in a specified location of the terminal device.

It can be understood that to support more operation instructions, the shape of the sliding track can further be subdivided. Different shapes correspond to different operation instructions, for example, the sliding track is a letter or a digit. This is not limited in the present disclosure.

Step S209: Query, in the mapping relationship database of the terminal device, an operation instruction that is associated with the tap gesture, and perform an operation that is indicated by the found operation instruction.

For example, if the tap gesture is a single-point single-tap gesture, and it is found, in the mapping relationship database of the terminal device, that an operation instruction associated with the single-point single-tap gesture is about entering an application setting, an operation of entering the application setting is performed, if the tap gesture is a single-point double-tap gesture, and it is found, in the mapping relationship database of the terminal device, that an operation instruction associated with the single-point double-tap gesture is about starting a browser, an operation of starting the browser is performed, if the tap gesture is a two-point single-tap gesture, and it is found, in the mapping relationship database of the terminal device, that an operation instruction associated with the two-point single-tap gesture is about starting a camera, an operation of starting the camera is performed, or if the tap gesture is a single-point three-tap gesture, and it is found, in the mapping relationship database of the terminal device, that an operation instruction associated with the single-point three-tap gesture is about starting a full-screen capture, an operation of capturing the full screen is performed, and a captured picture is stored in a specified location of the terminal device.

In an implementation in this embodiment of the present disclosure, a contact area and a z-axis acceleration that are generated on a touchscreen are obtained, a joint touch action is identified, a gesture type corresponding to the joint touch action is identified, and a preset function of a terminal device is called according to the gesture type. This provides an additional method for interaction with the terminal device based on the contact area and the z-axis acceleration, thereby enriching methods for interaction with the terminal device.

Figure 3:
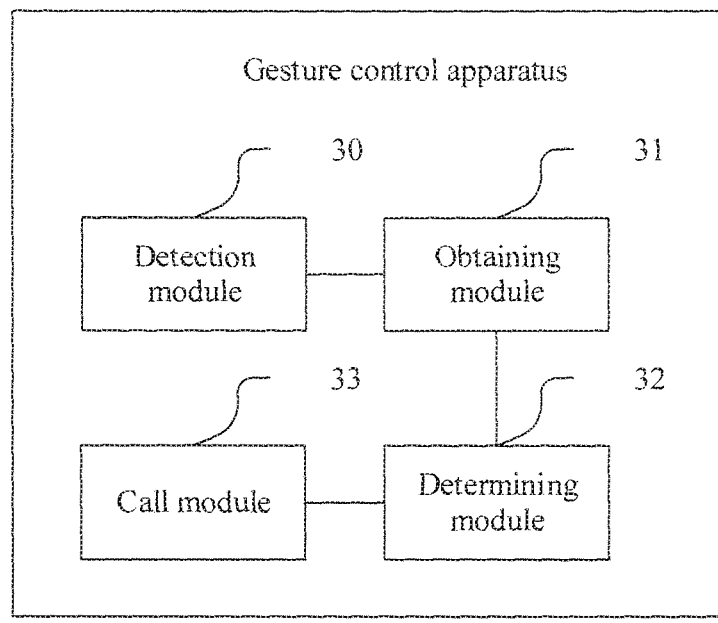
FIG. 3 is a schematic structural diagram of a gesture control apparatus according to an embodiment of the present disclosure.

Referring to FIG. 3, FIG. 3 is a schematic structural diagram of a gesture control apparatus according to an embodiment of the present disclosure. In this embodiment of the present disclosure, the gesture control apparatus includes a detection module 30, an obtaining module 31, a determining module 32, and a call module 33.

The detection module 30 is configured to detect a touch action performed on a touchscreen of a terminal device.

The obtaining module 31 is configured to obtain a contact area of the touch action on the touchscreen and a z-axis acceleration generated when the touch action is in contact with the touchscreen.

The determining module 32 is configured to determine that the touch action is a joint touch action if the contact area is larger than a preset area and the z-axis acceleration is greater than a preset acceleration.

The call module 33 is configured to identify a gesture type corresponding to the joint touch action, and call a preset function of the terminal device according to the gesture type.

In this embodiment of the present disclosure, the gesture control apparatus is configured to perform the gesture control method in the method embodiment 1. This embodiment of the present disclosure is based on a same conception as the method embodiment 1, and a technical effect brought by this embodiment of the present disclosure is also the same. For a specific process, refer to the description in the method embodiment 1, and details are not described herein again.

Figure 4:
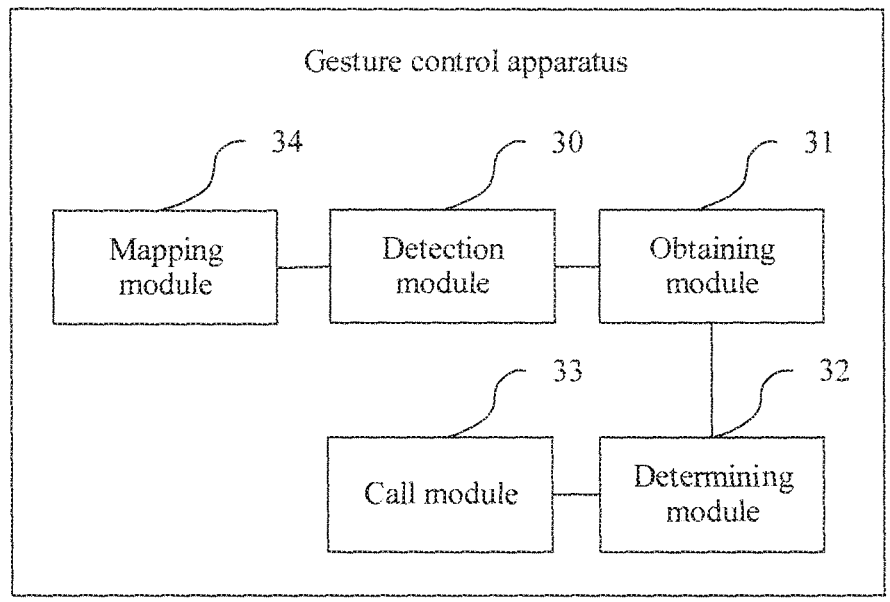
FIG. 4 is another schematic structural diagram of a gesture control apparatus according to an embodiment of the present disclosure.
Figure 5A:
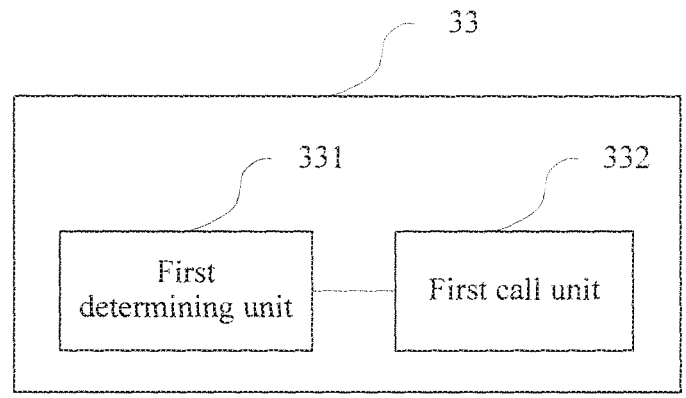
FIG. 5A is a schematic structural diagram of a call module shown in FIG. 4.
Figure 5B:
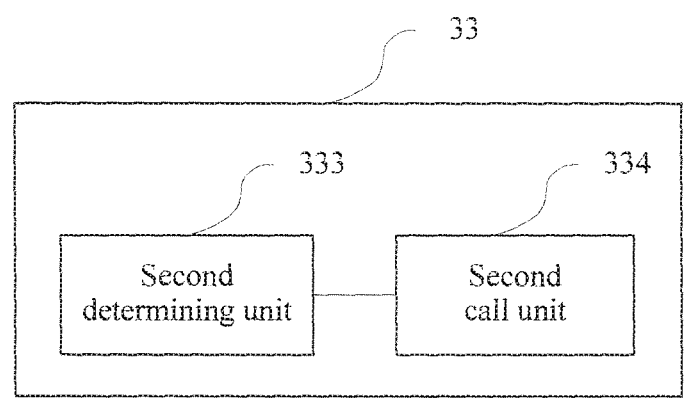
FIG. 5B is another schematic structural diagram of a call module shown in FIG. 4.
Figure 5C:
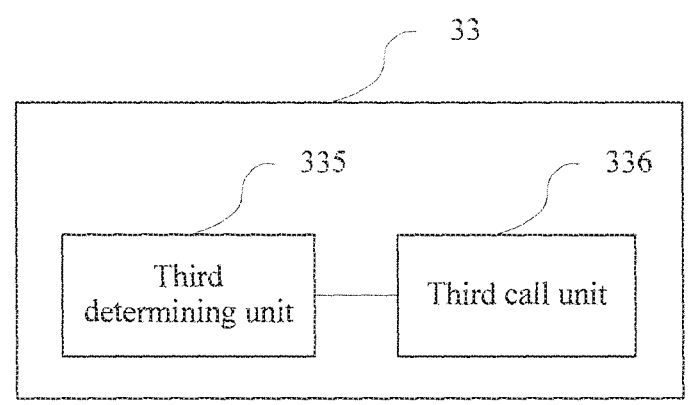
FIG. 5C is still another schematic structural diagram of a call module shown in FIG. 4.
Figure 6:
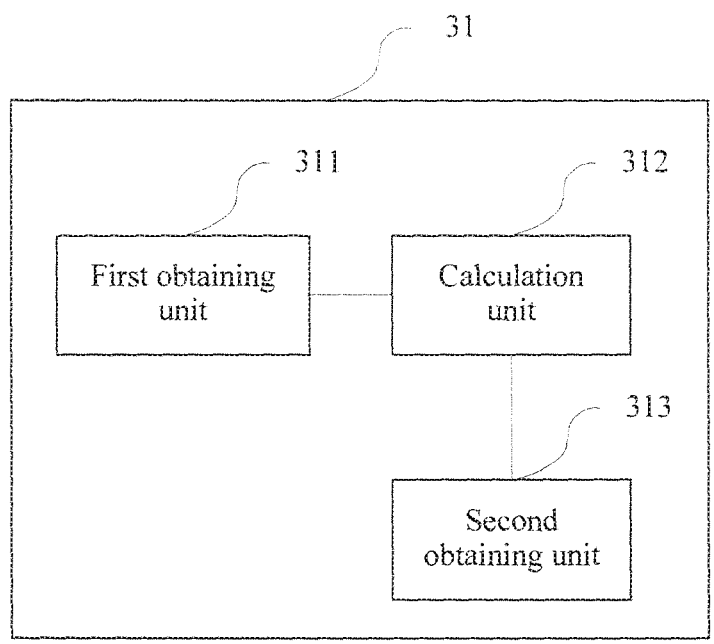
FIG. 6 is a schematic structural diagram of an obtaining module shown in FIG. 4.

Referring to FIG. 4 to FIG. 6, FIG. 4 to FIG. 6 are another schematic structural diagram of a gesture control apparatus according to an embodiment of the present disclosure. In this embodiment of the present disclosure, in addition to a detection module 30, an obtaining module 31, a determining module 32, and a call module 33, the gesture control apparatus further includes a mapping module 34.

The mapping module 34 is configured to customize a mapping relationship between the gesture type corresponding to the joint touch action and the preset function, and store the mapping relationship in a mapping relationship database.

Optionally, as shown in FIG. 5A, the call module 33 includes a first determining unit 331 and a first call unit 332.

The first determining unit 331 is configured to determine a user interface on which the joint touch action is performed and an application program to which the user interface belongs.

The first call unit 332 is configured to identify the gesture type corresponding to the joint touch action, and call a preset function corresponding to the application program according to the gesture type.

Optionally, as shown in FIG. 5B, the call module 33 includes a second determining unit 333 and a second call unit 334.

The second determining unit 333 is configured to determine a user interface on which the joint touch action is performed.

The second call unit 334 is configured to query an application program associated with the gesture type, and start or close the application program if the user interface on which the joint action is performed is a system desktop of the terminal device.

Optionally, as shown in FIG. 5C, the call module 33 includes a third determining unit 335 and a third call unit 336.

The third determining unit 335 is configured to determine a user interface on which the joint touch action is performed.

The third call unit 336 is configured to identify the gesture type corresponding to the joint touch action, and perform an operation on the user interface according to the gesture type, where the operation includes screen capture, icon arrangement, or theme replacement.

Optionally, the tap gesture includes the gesture type corresponding to the touch action includes a tap gesture or a sliding gesture, where the tap gesture includes at least one of a single-point single-tap gesture, a single point multi-tap gesture, or a multi-point tap gesture, and the sliding track includes at least one of a closed track or a non-closed track.

Optionally, as shown in FIG. 6, the obtaining module 31 includes a first obtaining unit 311, a calculation unit 312, and a second obtaining unit 313.

The first obtaining unit 311 is configured to obtain, a quantity m of pixels of the touch action in a contact region of the touchscreen, a quantity n of pixels of the touchscreen, and an area s of the touchscreen.

The calculation unit 312 is configured to obtain the contact area of the touch action on the touchscreen by means of calculation using a formula s*(m/n).

The second obtaining unit 313 is configured to obtain the z-axis acceleration of the touch action using a gravity acceleration sensor that comes with a terminal device.

In this embodiment of the present disclosure, the gesture control apparatus is configured to perform the gesture control method in the method embodiment 2. This embodiment of the present disclosure is based on a same conception as the method embodiments 1 and 2, and a technical effect brought by this embodiment of the present disclosure is also the same. For a specific process, refer to the description in the method embodiments 1 and 2, and details are not described herein again.

Figure 7:
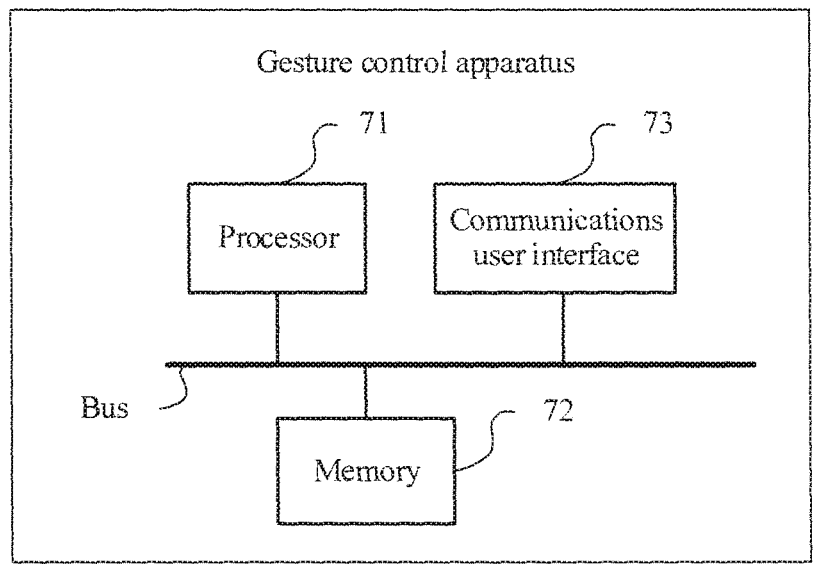
FIG. 7 is still another schematic structural diagram of a gesture control apparatus according to an embodiment of the present disclosure.

Referring to FIG. 7, FIG. 7 is still another schematic structural diagram of a gesture control apparatus according to an embodiment of the present disclosure. In this embodiment of the present disclosure, the gesture control apparatus is configured to achieve the gesture control method in this embodiment of the present disclosure. The gesture control apparatus includes a processor 71, a memory 72, and a communications user interface 73. There may be one or more processors 71 in the gesture control apparatus, and one processor 71 is used as an example in FIG. 7. In some embodiments of the present disclosure, the processor 71, the memory 72, and the communications user interface 73 may be connected using a bus or in another manner, and a bus connection is used as an example in FIG. 7.

The memory 72 stores a set of program code. The processor 71 is configured to call the set of program code stored in the memory 72 in order to perform the operations of detecting a touch action performed on a touchscreen of a terminal device, obtaining a contact area of the touch action on the touchscreen and a z-axis acceleration generated when the touch action is in contact with the touchscreen, determining that the touch action is a joint touch action if the contact area is larger than a preset area and the z-axis acceleration is greater than a preset acceleration, identifying a gesture type corresponding to the joint touch action, and calling a preset function of the terminal device according to the gesture type.

In some embodiments of the present disclosure, that the processor 71 identifying the gesture type corresponding to the joint touch action, and calling a corresponding preset function of the terminal device according to the gesture type includes determining a user interface on which the joint touch action is performed and an application program to which the user interface belongs, identifying the gesture type corresponding to the joint touch action, and calling a preset function corresponding to the application program according to the gesture type.

In some embodiments of the present disclosure, that the processor 71 identifying the gesture type corresponding to the joint touch action, and calling a corresponding preset function of the terminal device according to the gesture type includes determining a user interface on which the joint touch action is performed, and querying an application program associated with the gesture type, and starting or closing the application program if the user interface on which the joint action is performed is a system desktop of the terminal device.

In some embodiments of the present disclosure, that the processor 71 identifying the gesture type corresponding to the joint touch action, and calling a corresponding preset function of the terminal device according to the gesture type includes determining a user interface on which the joint touch action is performed, and identifying the gesture type corresponding to the joint touch action, and performing an operation on the user interface according to the gesture type, where the operation includes screen capture, icon arrangement, or theme replacement.

In some embodiments of the present disclosure, the gesture type corresponding to the touch action includes a tap gesture or a sliding gesture, where the tap gesture includes at least one of a single-point single-tap gesture, a single-point multi-tap gesture, or a multi-point tap gesture, and the sliding track includes at least one of a closed track or a non-closed track.

In some embodiments of the present disclosure, that the processor 71 obtaining a contact area of the touch action on the touchscreen and a z-axis acceleration generated when the touch action is in contact with the touchscreen includes obtaining a quantity m of pixels of the touch action in a contact region of the touchscreen, a quantity n of pixels of the touchscreen, and an area s of the touchscreen, obtaining the contact area of the touch action on the touchscreen by means of calculation using a formula s*(m/n), and obtaining the z-axis acceleration of the touch action using a gravity acceleration sensor that comes with the terminal device.

In some embodiments of the present disclosure, the processor 71 is further configured to perform the operations of customizing a mapping relationship between the preset function and the gesture type corresponding to the joint touch action, and storing the mapping relationship in a mapping relationship database.

In an implementation in this embodiment of the present disclosure, a contact area and a z-axis acceleration that are generated on a touchscreen are obtained, a joint touch action is identified, a gesture type corresponding to the joint touch action is identified, and a preset function of a terminal device is called according to the gesture type. This provides an additional method for interaction with the terminal device based on the contact area and the z-axis acceleration, thereby enriching methods for interaction with the terminal device.

Figure 8:
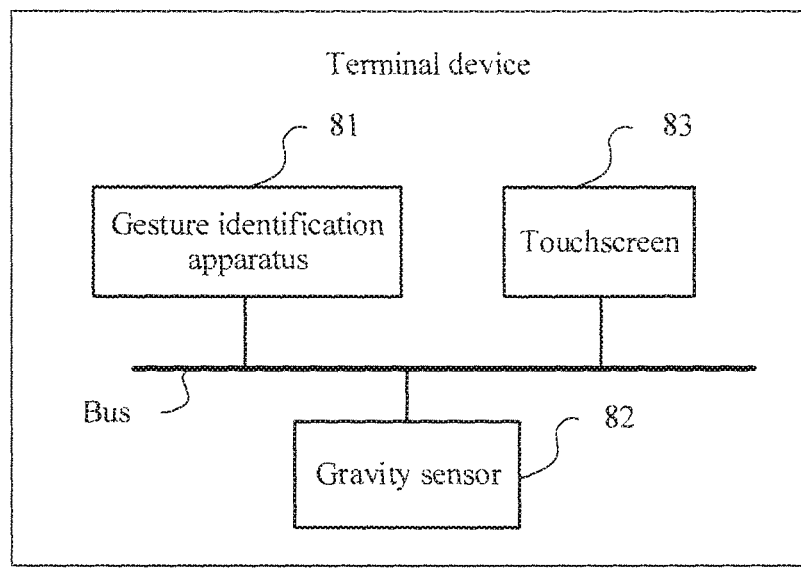
FIG. 8 is a schematic structural diagram of a terminal device according to an embodiment of the present disclosure.

An embodiment of the present disclosure further provides a terminal device in FIG. 8, including a touchscreen 83, a gravity sensor 82, and a gesture identification apparatus 81. The touchscreen 83, the gravity sensor 82, and the gesture identification apparatus 81 may be connected using a bus, or may be connected in another manner. The gesture identification apparatus 81 is the gesture control apparatus described in the apparatus embodiments 1 and 2. The gravity sensor is configured to obtain a z-axis acceleration generated when a touch action is in contact with a touchscreen. The terminal device may be a smartphone, a tablet, or another device with a touchscreen. For a specific working process of the terminal device, refer to the descriptions in the method embodiments 1 and 2. Details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a ROM, or a random access memory (RAM).

What is disclosed above is merely examples of embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A method, comprising:
detecting a first touch action performed on a touchscreen of a terminal device;
obtaining a first contact area of the first touch action on the touchscreen by:
  obtaining a quantity of pixels (m) of the first touch action in a contact region of the touchscreen, a total quantity of pixels (n) included in the touchscreen, and a total area (s) occupied by the touchscreen; and
  obtaining the first contact area of the first touch action on the touchscreen by calculation using a formula s*(m/n);
obtaining, using a gravity acceleration sensor of the terminal device, a first z-axis acceleration generated in response to identifying that the first touch action is in contact with the touchscreen;
identifying that the first touch action is a first joint touch action in response to identifying that the first contact area is larger than a preset area and the first z-axis acceleration is greater than a preset acceleration;
identifying a first gesture type corresponding to the first joint touch action as a three-point single-tap gesture type;
calling a full-screen capture function of the terminal device in response to identifying that the first gesture type is the three-point single-tap gesture type;
detecting a second touch action performed on the touchscreen;
obtaining a second contact area of the second touch action on the touchscreen and a second z-axis acceleration generated in response to identifying that the second touch action is in contact with the touchscreen;
identifying that the second touch action is a second joint touch action in response to identifying that the second contact area is larger than the preset area and the second z-axis acceleration is greater than the preset acceleration;
identifying a second gesture type corresponding to the second joint touch action as an S-track gesture type; and
calling a photographing function of the terminal device in response to identifying that the second gesture type is the S-track gesture type.

2. The method of claim 1, wherein prior to identifying the first gesture type, the method comprises
determining that a user interface on which the first joint touch action is performed is the user interface of an instant communications software and wherein the full-screen capture function is called based on the first gesture type being the three-point single-tap gesture type and the user interface being the user interface of the instant communications software.

3. The method of claim 1, wherein identifying the first gesture type and calling the full-screen capture function comprises:
determining a user interface on which the first joint touch action is performed;
querying an application program associated with the three-point single-tap gesture type; and starting the application program in response to identifying that the user interface on which the first joint touch action is performed is a system desktop of the terminal device.

4. The method of claim 1, wherein before detecting the first touch action, the method further comprises:
customizing a mapping relationship between the full-screen capture function and the three-point single-tap gesture type; and
storing the mapping relationship in a mapping relationship database.

5. The method of claim 1, further comprising:
determining a user interface on which the first joint touch action is performed;
querying an application program associated with the first gesture type; and
closing the application program in response to identifying that the user interface on which the first joint touch action is performed is a system desktop of the terminal device.

6. The method of claim 1, further comprising:
determining a user interface on which the second joint touch action is performed; and
performing an operation on the user interface according to the second gesture type, wherein the operation comprises icon arrangement.

7. The method of claim 1, further comprising:
determining a user interface on which the second joint touch action is performed; and
performing an operation on the user interface according to the second gesture type, wherein the operation comprises theme replacement.

8. The method of claim 1, further comprising:
detecting a third touch action performed on the touchscreen;
obtaining a third contact area of the third touch action and a third z-axis acceleration generated when the third touch action is in contact with the touchscreen;
identifying that the third touch action is the second joint touch action in response to identifying that the third contact area is larger than the preset area and the third z-axis acceleration is greater than the preset acceleration;
identifying a third gesture type corresponding to a third touch action as a second-track gesture type; and
calling the photographing function of the terminal device in response to identifying that the third gesture type is the second-track gesture type.

9. A gesture-identification apparatus, comprising:
a gravity acceleration sensor;
a memory comprising program code; and
a processor coupled to the memory and the gravity acceleration sensor, wherein the processor is configured to execute the program code to cause the processor to be configured to:
detect a touch action performed on a touchscreen of a terminal device;
obtain a contact area of the touch action on the touchscreen, wherein the program code is configured to cause the processor to obtain the contact area by causing the processor to:
obtain a quantity of pixels (m) of the touch action in a contact region of the touchscreen, a total quantity of pixels (n) included in the touchscreen, and a total area (s) occupied by the touchscreen; and
obtain the contact area of the touch action on the touchscreen by calculation using a formula s*(m/n);
obtain, using the gravity acceleration sensor, a z-axis acceleration generated in response to identifying that the touch action is in contact with the touchscreen;
determine that the touch action is a joint touch action in response to identifying that the contact area is larger than a preset area and the z-axis acceleration is greater than a preset acceleration;
identify a gesture type corresponding to the joint touch action as a three-point single-tap gesture type;
call a full-screen capture function of the terminal device in response to identifying that the gesture type is the three-point single-tap gesture type;
detect a second touch action performed on the touchscreen;
obtain a second contact area of the touch action on the touchscreen and a second z-axis acceleration generated in response to identifying that the second touch action is in contact with the touchscreen;
identify that the second touch action is a second joint touch action in response to identifying that the second contact area is larger than the preset area and the second z-axis acceleration is greater than the preset acceleration;
identify a second gesture type corresponding to the second joint touch action as an M-type track gesture type; and
call a video recording function of the terminal device in response to identifying that the second gesture type is the M-type gesture type.

10. The gesture-identification apparatus of claim 9, wherein in response to identifying the gesture type and calling the full-screen capture function, the program code further causes the processor to be configured to:
determine that a user interface on which the joint touch action is performed is the user interface of an instant communications software; and
call the full-screen capture function based on the gesture type being the three-point single-tap gesture type and the user interface being the user interface of the instant communications software.

11. The gesture-identification apparatus of claim 9, wherein the program code further causes the processor to be configured to:
determine a user interface on which the joint touch action is performed;
query an application program associated with the three-point single-tap gesture type; and
start the application program in response to identifying that the user interface on which the joint touch action is performed is a system desktop of the terminal device.

12. The gesture-identification apparatus of claim 9, wherein the program code further causes the processor to be configured to:
customize a mapping relationship between the full-screen capture function and the three-point single-tap gesture type; and
store the mapping relationship in a mapping relationship database.

13. The gesture-identification apparatus of claim 9, wherein the program code further causes the processor to be configured to:
determine a user interface on which the joint touch action is performed;

query an application program associated with the gesture type; and close the application program in response to identifying that the user interface on which the joint touch action is performed is a system desktop of the terminal device.

14. The gesture-identification apparatus of claim 9, wherein the program code further causes the processor to be configured to:
   determine a user interface on which the second joint touch action is performed; and
   perform an operation on the user interface according to the second gesture type, wherein the operation comprises icon arrangement.

15. The gesture-identification apparatus of claim 9, wherein the program code further causes the processor to be configured to:
   determine a user interface on which the second joint touch action is performed; and
   perform an operation on the user interface according to the second gesture type, wherein the operation comprises theme replacement.

16. The gesture-identification apparatus of claim 9, wherein the program code further causes the processor to be configured to:
   detect a third touch action performed on the touchscreen;
   obtain a third contact area of the third touch action and a third z-axis acceleration generated in response to identifying that the third touch action is in contact with the touchscreen;
   identify that the third touch action is the second joint touch action in response to identifying that the third contact area is larger than the preset area and the third z-axis acceleration is greater than the preset acceleration;
   identify a third gesture type corresponding to the third touch action as a second-track gesture type; and
   call a photographing function of the terminal device in response to identifying that the third gesture type is the second-track gesture type.

17. A non-transitory storage medium storing computer-executable instructions that, when executed by a computer, cause the computer to be configured to:
   detect a touch action performed on a touchscreen of a terminal device;
   obtain a contact area of the touch action on the touchscreen, wherein the computer-executable instructions are configured to cause the computer to obtain the contact area by causing the computer to:
      obtain a quantity of pixels (m) of the touch action in a contact region of the touchscreen, a total quantity of pixels (n) included in the touchscreen, and a total area (s) occupied by the touchscreen; and
      obtain the contact area of the touch action on the touchscreen by calculation using a formula s*(m/n);
   obtain, using a gravity acceleration sensor, a z-axis acceleration generated in response to identifying that the touch action is in contact with the touchscreen;
   determine that the touch action is a joint touch action in response to identifying that the contact area is larger than a preset area and the z-axis acceleration is greater than a preset acceleration;
   identify a gesture type corresponding to the joint touch action as a three-point single-tap gesture type;
   call a full-screen capture function of the terminal device in response to identifying that the gesture type is the three-point single-tap gesture type;
   detect a second touch action performed on the touchscreen;
   obtain a second contact area of the touch action on the touchscreen and a second z-axis acceleration generated in response to identifying that the second touch action is in contact with the touchscreen;
   identify that the second touch action is a second joint touch action in response to identifying that the second contact area is larger than the preset area and the second z-axis acceleration is greater than the preset acceleration;
   identify a second gesture type corresponding to the second joint touch action as an S-track gesture type; and
   call a photographing function of the terminal device in response to identifying that the second gesture type is the S-track gesture type.

18. The non-transitory storage medium of claim 17, wherein the computer-executable instructions further cause the computer to be configured to:
   determine a user interface on which the joint touch action is performed;
   query an application program associated with the gesture type; and
   close the application program in response to identifying that the user interface on which the joint touch action is performed as a system desktop of the terminal device.

19. The non-transitory storage medium of claim 17, wherein the computer-executable instructions further cause the computer to be configured to:
   determine a user interface on which the second joint touch action is performed;
   and perform an operation on the user interface according to the second gesture type, wherein the operation comprises icon arrangement.

20. The non-transitory storage medium of claim 17, wherein the computer-executable instructions further cause the computer to be configured to:
   determine a user interface on which the second joint touch action is performed; and
   perform an operation on the user interface according to the second gesture type, wherein the operation comprises theme replacement.

* * * * *

UNITED STATES PATENT AND TRADEMARK OFFICE
CERTIFICATE OF CORRECTION

Page 1 of 2

PATENT NO. : 10,802,704 B2
APPLICATION NO. : 15/566582
DATED : October 13, 2020
INVENTOR(S) : Wei Wang It is certified that error appears in the above-identified patent and that said Letters Patent is hereby corrected as shown below:

In the Claims

Column 18, Line 42, Claim 1 should read: "identifying that the first contact area is larger than the preset area and"

Column 19, Line 25, Claim 6 missing a line: "identifying the second gesture type corresponding to the second joint touch action; and"

Column 19, Line 32, Claim 7 missing a line: "identifying the second gesture type corresponding to the second joint touch action; and"

Column 20, Line 4, Claim 9 should read: "obtain, using the gravity acceleration sensor of the terminal device, a z-axis acceleration"

Column 20, Line 17, Claim 9 should read: "detect a sound touch action performed on the touchscreen;"

Column 20, Line 19, Claim 9 should read: "obtain a second contact area of a second touch action on the touchscreen and a second z-axis acceleration generated in response to identifying"

Column 20, Line 41, Claim 10 missing a line: "identify the gesture type corresponding to the joint touch action as the three-point single-tap gesture type; and"

Column 21, Line 20, Claim 15 missing a line: "is performed; and identify the second gesture type corresponding to the second joint touch action; and"

Column 22, Line 42, Claim 19 missing a line: "identify the second gesture type corresponding to the second joint touch action; and perform an operation"

Signed and Sealed this
Twenty-fourth Day of November, 2020

Andrei Iancu
*Director of the United States Patent and Trademark Office*

Column 22, Line 50, Claim 20 missing a line: "performed, and identify the second gesture type corresponding to the second joint touch action; and"